United States Patent [19]

Fukumura et al.

[11] Patent Number: 5,213,783
[45] Date of Patent: May 25, 1993

[54] PROCESS FOR PRODUCING FINELY DIVIDED PARTICLES OF II TYPE AMMONIUM POLYPHOSPHATE

[75] Inventors: Chikashi Fukumura, Kitakyushushi; Kouji Inoue, Yokohamashi; Masuo Iwata, Yokohamashi; Noriaki Narita, Yokohamashi; Masaya Tanaka, Kitakyushushi, all of Japan

[73] Assignee: Chisso Corporation, Osaka, Japan

[21] Appl. No.: 806,239

[22] Filed: Dec. 12, 1991

[30] Foreign Application Priority Data

Jan. 10, 1991 [JP] Japan .................. 3-12900
Jul. 2, 1991 [JP] Japan .................. 3-188096

[51] Int. Cl.$^5$ ............................. C01B 25/40
[52] U.S. Cl. ..................... 423/305; 423/315
[58] Field of Search ..................... 423/305, 315

[56] References Cited

U.S. PATENT DOCUMENTS

| | | | |
|---|---|---|---|
| 3,397,035 | 8/1968 | Shen et al. | 71/34 |
| 3,978,195 | 8/1976 | Schrodter et al. | 71/43 |
| 4,396,586 | 8/1983 | Maurer et al. | 423/315 |
| 4,511,546 | 4/1985 | Schrodter et al. | 423/315 |
| 4,515,632 | 5/1985 | Maurer et al. | 423/315 |

*Primary Examiner*—Wayne Langel
*Attorney, Agent, or Firm*—Fred Philpitt

[57] ABSTRACT

Finely divided particles of II type ammonium polyphosphate (APP) which, when added to polyolefin resins, etc., afford products having a small reduction in the mechanical characteristics, a reduced particle diameter and an increased specific surface area and nevertheless, having bleed resistance and flame retardancy similar to those of conventional products, and a process for producing the particles are provided, the particles being characterized in that 80% by weight or more thereof have a particle diameter of 10 μm or less and 5% aqueous solution thereof dissolved in 80° C. water has 500 cps or more, and the process being a process for producing the particles by reacting ammonium phosphate with $P_2O_5$, each in a nearly equimolar quantity, in a $NH_3$ gas atmosphere and at an elevated temperature, comprising a first reaction step carried out in $N_2$ gas atmosphere without feeding $NH_3$ gas, a second reaction step of instantaneously feeding $NH_3$ gas or a $NH_3$-generating substance when hot, in 3 to 90% of the stoichiometrical quantity, and a third reaction step of slowly adding $NH_3$ gas in a quantity or more of the remainder of the stoichiometric quantity and aging therewith, to crystallize the resulting II type APP.

4 Claims, 1 Drawing Sheet

I TYPE

II TYPE

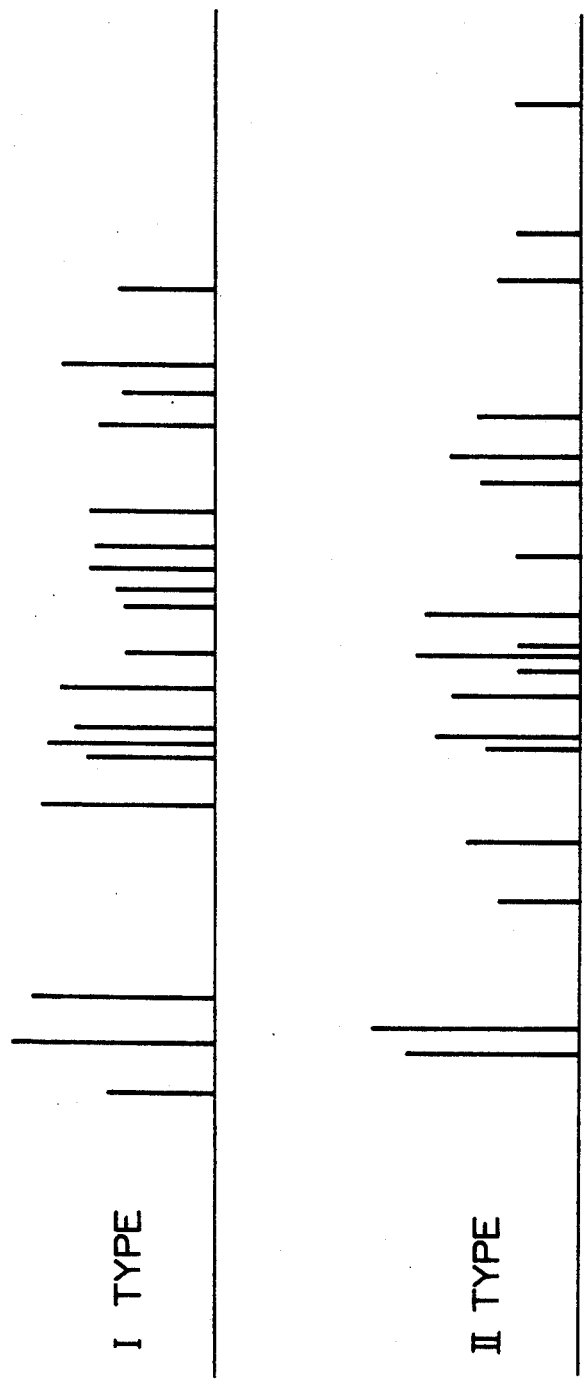

PROCESS FOR PRODUCING FINELY DIVIDED PARTICLES OF II TYPE AMMONIUM POLYPHOSPHATE

BACKGROUND OF THE INVENTION

1. Field of the Invention

This invention relates to finely divided particles of ammonium polyphosphate (APP) having a II type crystalline structure, the particle diameter of 80% by weight or more of the particles being 10 μm or less, and the surface of the crystals being plain, and a process for producing the particles.

More particularly, the present invention relates to finely divided particles of APP which, when added or impregnated into the inside of polyolefin resins, molded products or fibers, afford products having a small reduction in the mechanical characteristics of polyolefins, molded products, fibers or the like, a reduced particle diameter and an increased specific surface area, and nevertheless having bleed resistance and flame retardancy similar to those of conventional products, and a process for producing the particles.

2. Description of the Related Art

It has been well known that APP is obtained by heat-condensing a mixture consisting of a phosphate-containing substance and an ammoniating-condensing agent. However, when conventional APP is added or impregnated into polyolefin resins, molded products, fibers or the like, in order to impart flame retardancy, the following disadvantageous problems are raised:

1. Unevenness of flame retardancy and reduction in the mechanical strengths, due to large particle diameter;
2. reduction in the bleed resistance due to I type crystalline structure;
3. reduction in the bleed resistance due to straining of the crystalline surface of APP, brought about by excess mechanical grinding;
4. reduction in the bleed resistance due to insufficient viscosity of a suspension solution of 5% APP in hot water; etc.

For example, according to Japanese patent publication No. Sho 53-11280, particles of APP having particle diameters as large as 63 μm or less (average particle diameter: 15 μm) occupy 94% by weight of the total particles; thus, when the particles are mechanically ground in order to finely grind them, the crystalline surface is strained to thereby raise the disadvantages described above in items 1 and 3. Further, according to Japanese patent publication Nos. Sho 53-15478 and Sho 49-30356, the resulting APPs have I type crystalline structure.

The object of the present invention is to provide finely divided particles of APP having solved the above-mentioned disadvantageous problems and a process for producing the same.

SUMMARY OF THE INVENTION

The present invention has the following constitutions (1) to (8):

(1) Finely divided particles of synthesized ammonium polyphosphate (hereinafter abbreviated to APP) having a II type crystalline structure, 80% by weight or more of said particles having a particle diameter of 10 μm or less.

(2) Finely divided particles of APP according to item (1), wherein a 5% aqueous solution of said particles obtained by dissolving them in hot water at 80° C. has a viscosity of 500 centiposes or more.

(3) In the process for producing finely divided particles of APP by reacting ammonium phosphate with phosphorous anhydride, each in an equimolar quantity, in an ammonia gas atmosphere and at an elevated temperature, a process for producing finely divided particles of APP as set forth in item (1), comprising making the reaction temperature of the two raw materials 250° C. or higher to thereby bring the materials into molten state, followed by instantaneously adding to the resulting reaction material, ammonia gas or an ammonia-generating compound to thereby instantaneously feed ammonia and crystallize the resulting material.

(4) A process for producing finely divided particles of APP according to item (3), wherein said ammonia-generating compound is a substance generating ammonia gas by heating urea, ammonium carbonate or ammonium carbamate, mixtures of the foregoing or aqueous solutions of the foregoing.

(5) In the process for producing finely divided particles of ammonium polyphosphate by reacting ammonium phosphate with phosphorous anhydride, each in a nearly equimolar quantity, in an ammonia gas atmosphere and at an elevated temperature, a process for producing finely divided particles of a II type ammonium polyphosphate, comprising
a first reaction step of reacting the raw materials in a nitrogen gas atmosphere without feeding ammonia gas,
a second reaction step of instantaneously feeding ammonia gas or an ammonia gas-generating substance when hot (referred to as ammoniating compound), in 30 to 90% of the stoichiometric quantity relative to polyammonium hydrogen phosphate or polyammonium phosphate, and
a third reaction step of slowly adding ammonia gas in a quantity or more of the remainder of the stoichiometric quantity and aging therewith, to crystallize the resulting II type ammonium polyphosphate.

(6) A production process according to item (5), wherein in said first reaction step of feeding no ammonia gas in nitrogen gas atmosphere, the reaction temperature is kept at 250° to 320° C. for 10 minutes or longer.

(7) A production process according to item (5), wherein in the second step of instantaneously feeding ammonia or an ammoniating agent in 90% or less of the stoichiometric quantity, the time necessary for the feeding is made 5 to 30 minutes.

(8) A production process according to item (5), wherein in the third reaction step of slowly adding ammonia gas and aging therewith, an atmospheric temperature of 240° C. or higher is applied for 30 minutes or longer.

BRIEF DESCRIPTION OF THE DRAWINGS

FIG. 1 shows X-ray diffraction patterns of I type and II type crystalline structures of ammonium polyphosphate relative to the present invention.

DETAILED DESCRIPTION OF THE INVENTION

The constitution and effectiveness of the present invention will be described below.

The finely divided particles of APP of the present invention are those having the growth of the crystals inhibited while maintaining the II type crystalline structure during the reaction process, and 80% by weight or more of the particles have a particle diameter of 10 μm or less. The crystalline structure of APP includes I type and II type as shown in the accompanying drawing, FIG. 1. These I type and II type structures have X-ray diffraction patterns of No. 220061 and No. 220062 described in JCPDS card, respectively.

When the finely divided particles of APP of the present invention are produced by heating ammonium phosphate and phosphorous anhydride ($P_2O_5$) each in a nearly equimolar quantity in an ammonia gas atmosphere and at an elevated temperature, the particles are obtained through a first reaction step of forming the II type structure, a second reaction step of forming finely divided crystalline nuclei by means of ammonia gas or an ammoniating agent and a third reaction step of heat-aging and then cooling in an atmosphere of gaseous ammonia. The first reaction step for forming the II type structure of the present invention is effected by heat-melting and agitating ammonium phosphate and phosphorous anhydride each in a nearly equimolar quantity in nitrogen gas atmosphere and at a temperature of 250° C. or higher, preferably at 270° to 320° C. The molar ratio of ammonium phosphate to phosphorous anhydride is preferred to be nearly equimolar. If it is not nearly equimolar, I type APP mixes in the resulting product. Further, at a reaction temperature lower than 250° C. and before the first step reaction step, there occur disadvantages that I type and other types APP are byproduced, and the viscosity of 5% hot water solution of the resulting material extraordinarily lowers.

The ammonia-generating compound (hereinafter abbreviated to ammoniating agent) referred to herein means substances generating ammonia gas by heating, such as urea, ammonium carbonate, ammonium carbamate, etc. or mixtures of the foregoing or aqueous solutions of the foregoing. The second reaction step for forming finely divided crystalline nuclei by means of an ammoniating agent, of the present invention, refers to a step of adding an ammoniating agent in a quantity capable of instantaneously feeding 30 to 90% by weight of stoichiometrically necessary quantity of ammonia, with stirring or during kneading or under spraying, to a first period molten reaction liquid obtained at the first reaction step having formed a II type structure, to thereby effect instantaneous crystallization. If the quantity of the ammoniating agent is too large, I type and other types APPs are byproduced and the viscosity of 5% hot water solution lowers, while if it is too small, APP having a particle diameter larger than that desired is obtained. The third reaction step of the present invention refers to a process of continuously subjecting granular powder obtained at the second reaction step, to agitation treatment at 250° C., preferably at 270° to 320° C. for 1 to 10 hours, preferably 2 to 5 hours.

The reaction originates in known reaction equations, but preparation of the finely divided particles of II type APP of the present invention proceeds through the following two reaction steps:

the first reaction step: initial period melting reaction

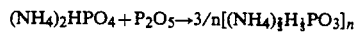

or

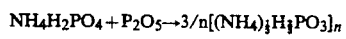

the second reaction step: middle period crystallization reaction

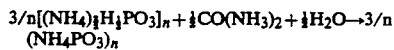

or

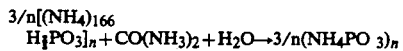

wherein n < 10,000.

Effectiveness of the Invention

The APP of the present invention has a II type crystalline structure, a smooth crystalline surface and a small particle diameter (the crystals having 10 μm or less: 80% by weight or more); hence when it is incorporated into polyolefin resins, molded products, fibers, etc., it is densely dispersed therein to thereby improve the mechanical strength thereof. In addition, a II type APP prepared according to a known method and a commercially available II type APP (Exolit 422), each have a particle diameter of the particles of 63 μm or less: 94% and an average particle diameter of 15 μm, such particle diameters being far larger than those of the APP of the present invention. Such APPs are provided with characteristics unable to be finely divided by mechanically grinding. Finely divided particles obtained by ultra-violent grinding, for example, grinding by means of ball mill or the like over several hours, are split in the length direction of crystals, injured on the crystalline surface or lose smoothness to cause strain.

The APP of the present invention has a II type crystalline structure and further has a smooth surface structure; hence when it is incorporated into polyolefin resins, molded products, fibers, etc. and the resulting material is exposed to a high temperature and high humidity atmosphere, dissolving-out of the incorporated APP onto the surface of the polyolefins, molded products, fibers, etc. is not observed. The APP of the present invention is a high molecular weight substance having a molecular weight of about 3,000,000 and its hot water-dissolved liquid exhibits a high viscosity. For example, its 5% hot water solution exhibits a viscosity of 100 to 10,000 cps. Thus, the finely divided particles of APP of the present invention are suitably usable as a flame retarder for resins, fibers, paper-making, lacquor, paint, etc. Examples are described below.

EXAMPLE

The raw materials used therein and the evaluations of the physical properties thereof are as follows:

Raw materials:
Ammonium phosphate: industrial monoammonium phosphate and diammonium phosphate made by Taihei Kagaku Kogyo Co., Ltd.
Phosphorous anhydride: phosphorous anhydride ($P_2O_5$) made by Rasa Kogyo Co., Ltd.
Urea: granular urea made by Ube Kosan Co., Ltd.
Ammonium carbonate: first grade reagent.

Commercially available II type APP: Exolit 422 made by Höchst Co., Ltd.

I type APP: product synthesized by Chisso Corporation.

Polypropylene resin: ethylene-propylene block copolymer (ethylene content: 8.5 wt. %, melt flow rate: 20 g/10 min.).

Polyethylene resin: M680 made by Chisso Corporation (melt index: 6.5 g/10 min.)

Ethylene-propylene rubber: Japan Synthetic Rubber Co., Ltd. (EP 02P).

Flame retarder: polymer of 2-piperadinylene-4-morpholino-1,3,5-triazine.

Measurement method of physical properties

1) Particle diameter and particle size distribution: Instrument for particle size distribution based upon Stokes settling equation as principle. CAPA-500® made by Horiba Seisakusho Co., Ltd.

2) Viscosity of 5% solution:

APP (5 g) was suspended in hot purified water (95 g) at 80° C., followed by agitating and dissolving the suspension while keeping it at the same temperature for 5 minutes and cooling down to 25° C. The viscosity of a portion of the resulting solution was measured using a viscometer, VISCONIC(EMD)® made by Tokyo Keiki Co., Ltd.

3) Molecular weight:

Measured by a high speed liquid chromatograph made by Waters Co., Ltd., using polyethylene glycol and polyethylene oxide, each having an already known molecular weight, as a standard substance.

4) Crystalline form:

According to X-ray diffraction method.

5) Combustion properties:

Tested according to UL-94 (Underweriters Laboratories). According to UL-94, a vertical combustion test was employed, and the evaluation was classified into V-2, V-1 and V-0 depending upon fire retardancy. As to the percentage of cotton ignition, a melt was dropped onto a surgical absorbent wadding placed 30 cm below the test piece, and it was confirmed whether the wadding ignited or not.

6) Bleed test:

A test piece (100 mm long, 100 mm wide, 2 mm thick) was exposed in a thermo-hygrostat (80° C., 80% RH) for a definite period, followed by drying in a hot air drier at 80° C. for 2 hours and allowing to stand in a desicator at room temperature overnight. The resulting sample was subjected to measurement of the surface electric resistance value according to JIS K6911. The period since the time subjected to the test till the time at which the reduction in the surface electric resistance value was observed was regarded as the number of days during which bleed resistance was retained.

7) Izod impact test (notched):

Carried out according to JIS K7110.

8) Drop impact test according to Dupont's method:

Under conditions of using a test piece of 50×50×2 mm, employing a device shown in JIS K-5400-8.3.2, using a point of impact having a tip curvature radius of ¼ inch and using a stand for bearing the point of impact having an inner diameter of 3/2 inch, and varying the load of the point of impact and the dropping height, the test and evaluation were carried out.

Example 1

A mixture of $(NH_4)_2HPO_4$ (660 g, 5 mols) with $P_2O_5$ (710 g, 5 mols) was placed in a total capacity 5 l bench kneader heated up to 290° C. to 300° C., while keeping a nitrogen gas atmosphere, followed by heating it with stirring. After 5 minutes, the total quantity melted to form a melt at 286° C. To a viscous liquid after lapse of 20 minutes was sprayed 76.9% urea aqueous solution at 80° C. (195 g, 5 mols in the form of byproduct $NH_3$) for 5 minutes. The reaction material solidified instantaneously to form a granular powder, followed by successively subjecting the powder to heat-treatment with stirring in an ammonia gas atmosphere at 250° to 270° C. over 2.5 hours to obtain powdery APP (1,460 g). A portion of this product was observed by means of a scanning electronic microscope. As a result, it was single crystals having a particle diameter of 4 to 10 μm and an aggregate of such single crystals. In order to separate this aggregate into single crystals, it was roughly ground by means of a grinder (AP-B type, made by Hosokawa Micron Co., Ltd.) in an ammonia gas atmosphere. The physical properties of the resulting product are shown in Table 1.

Example 2

Example 1 was repeated except that $NH_3$ gas was used as the atmosphere of the initial period melting reaction. The results are shown in Table 1.

Example 3

Example 1 was repeated except that $NH_3$ gas was used at the time of the initial period melting reaction and the reaction was carried out at 270° to 300° C. The results are shown in Table 1.

Examples 4–6

Example 1 was repeated except that the ammoniating agent added under spraying to the reaction liquid was of the following kinds and in the following quantities:

| | Kind of ammoniating agent | Its quantity |
|---|---|---|
| Example 4 | Urea | 150 g |
| Example 5 | Ammonium carbonate | 240 g |
| Example 6 | Urea | 75 g |
| | Ammonium carbonate | 120 g |

The results are shown in Table 1.

Comparative example 1

A mixture of $NH_4H_2PO_4$ (288 g, 2.5 mols) with $CO(NH_2)_2$ (150 g, 2.5 mols) was placed in a total capacity 5 l bench kneader heated up to 250° C., while keeping an $NH_3$ gas atmosphere, followed by heating it with stirring. After about one hour the reaction material afforded a granular product with accompaniment of generation of a large quantity of gas ($CO_2$ and $NH_3$), as shown in the following equation (1):

$$nNH_4H_2PO_4 + nCO(NH_2)_2 \rightarrow (NH_4PO_3)_n + nCO_2 + 2nNH_3 \quad (1)$$

The resulting material was roughly ground by means of a grinder in the same manner as in Example 1. The results are shown in Table 1.

Comparative example 2

A mixture of (NH₄)₂HPO₄ (660 g, 5 mols) with $P_2O_5$ (710 g, 5 mols) was placed in a total capacity 5 l bench kneader heated up to 290° to 300° C., while passing $NH_3$ gas therethrough at a rate of 112 l (5 mols) per hour, followed by heating it with stirring. After 5 minutes, the total quantity melted to form a viscous liquid, and after 90 minutes, a powdery APP was obtained. In order to separate single crystals from the APP, they were ground by means of a grinder in the same manner as in Example 1. The results are shown in Table 1.

Comparative example 3

The product obtained in Comparative example 2 had an average particle diameter of 12.5 μm; thus, in order to obtain a particle diameter similar to that in Example 1, a 40% methanol slurry (750 g) of the APP was placed in a vibration ball mill (B-1 type, made by Chuoh Kakoki Co., Ltd.), followed by grinding it for 3 hours. A portion of the resulting material was observed by a scanning electronic microscope. As a result, the particle diameter was not reduced, it was split in the length direction, it was twisted or the smoothness of the crystalline surface was lost. The physical properties of the product are shown in Table 1.

Comparative example 4

A commercially available II type APP (Exolit 422 ®) made by Höchst Co., Ltd.) was used as it was.

TABLE 1

| | Physical properties | | | | |
|---|---|---|---|---|---|
| | | Particle diameter distribution | | | |
| Example | Crystalline form | Average (μm) | % of particles of particle diameter of 10 μm or less | Viscosity of 5% solution (cp) | Average M.W. × 10⁴ |
| Example 1 | II | 6.4 | 82 | 7150 | 235 |
| Example 2 | II | 6.5 | 82 | 5690 | 220 |
| Example 3 | II | 6.3 | 82 | 7245 | 247 |
| Example 4 | II | 7.0 | 81 | 4250 | 235 |
| Example 5 | II | 6.3 | 81 | 2483 | |
| Example 6 | II | 7.0 | 83 | 3840 | 259 |
| Comp. ex. 1 | I | 17.0 | 3 | 5 | 4 |
| Comp. ex. 2 | II | 12.5 | 33 | 17000 | 311 |
| Comp. ex. 3 | II | 8.4 | 50 | 2890 | |
| Comp. ex. 4 | II | 15.0 | 22 | 690 | 235 |

Example 7 and Comparative examples 5-8

Example 7

A crystalline ethylene-propylene block copolymer as a polypropylene resin (ethylene content: 8.5% by weight, melt flow rate (quantity of molten resin extruded for 10 minutes when a load of 2.16 Kg was applied at 230° C.): 20 g/10 min. (70% by weight); an APP as component (C) prepared in Example 1 (20% by weight); a polymer of 2-piperadinylene-4-morpholino-1,3,5-triazine as component (D) (10% by weight); and as other additives, 2,6-di-t-butyl-p-cresol (0.15% by weight), di-myristyl-β, β'-thiodipropionate (0.2% by weight) and calcium stearate (0.1% by weight), were placed in Cooking Mixer (tradename), followed by mixing them with stirring for one minute. The resulting mixture was extruded by means of Minimax (tradename) at a melt-kneading temperature of 210° C. and pelletized.

Further, in Comparative example 5, Exolit ® 422 made by Höchst Co., Ltd. was used as APP as component (C); in Comparative example 6, APP of I type crystalline form prepared in Comparative example 1 was used as APP as component (C); in Comparative example 7, the compound prepared in Comparative example 3 was used; and in Comparative example 8, MF82/PP (tradename, made by Montefluos Co., Ltd.), as a component (E), which was a mixture of Exolit ® 422 as APP with component (D), was blended in 30 wt. %, in place of components (C) and (D), and as to others, in the blending proportions according to Example 7, and using pellets obtained in the respective Examples and Comparative examples, definite test pieces for bleed test were molded by means of a heat press molding machine having the highest press temperature set to 210° C. Measurement of bleed test was carried out using the test pieces. The results are shown in Table 2.

Example 8

A crystalline ethylene-propylene block copolymer (ethylene content: 8.5 wt. % and melt flow rate (quantity of molten resin extruded for 10 minutes under a load of 2.16 Kg at 230° C.): 20 g/10 min., as a polypropylene resin (50 wt. %); an ethylene homopolymer (Chisso Polyethy ® M680 made by Chisso Corporation) (melt index (quantity of molten resin extruded for 10 min. under a load of 2.16 Kg at 190° C.)): 6.5 g/10 min. as a polyethylene resin, as a component (A) (10 wt. %); an ethylene-propylene rubber (JSR EP ® 02P, made by Japan Synthetic Rubber Co., Ltd.) as an ethylenic synthetic rubber or elastomer, as a component (B) (10 wt. %); APP prepared an Example 1, as a component (C) (21 wt. %); a product obtained by grinding polymer of 2-piperadinylene-4-morpholino-1,3,5-triazine as a component (D) by means of a conventional grinder (average particle diameter: 4μ) (8 wt. %); vinyltrimethoxysilane as a silane-coupling agent, as a component (F) (1 wt. %); and as other additives, 2,6-di-t-butyl-p-cresol (0.15 wt. %), dimyristyl-β,β'-thiodipropionate (0.2 wt. %) and calcium stearate (0.1 wt. %) were placed in Henschel mixer (tradename), followed by mixing them with stirring for 3 minutes, and melt-knead-extruding the mixture by means of an extruder having a hole diameter of 45 mm at a melt-kneading temperature of 200° C., to pelletize it.

The resulting pellets were dried at 100° C. for 3 hours, followed by molding the pellets by means of an injection molding machine having the highest temperature of the cylinder set to 220° C., into definite test pieces for fire retardancy, Izot impact strength and Dupont impact strength. Using these test pieces, fire retardancy, Izot impact strength and Dupont impact strength were measured. The results are shown in Table 3.

Example 9

Stirring-mixing, melt-knead-extrusion, pelletization, molding and the respective measurements were carried out in the same manner as in Example 8 except that a product obtained in Example 4 was used as APP of component (C). The results are shown in Table 3.

Comparative examples 9 and 10

In Comparative example 9, Exolit® 422 (made by Höchst Co., Ltd.) was used as APP of component (C), and in Comparative example 10, MF82/PP (tradename, made by Monteflous Co., Ltd.) as a component (E), which was a mixture of Exolit® 422 as APP with component (D) was blended in 29 wt. %, in place of components (C) and (D), and as to others, in the blending proportions according to Example 8, the respective blending components were placed in Henschel mixer (tradename), followed by agitating-mixing, melt-knead-extruding pelletizing and molding as in Example 8, and subjecting the resulting pellets to the respective measurements. The results are shown in Table 3.

TABLE 2

| | Component (C) wt. % | Component (D) wt. % | Component (E) wt. % | Component (G) wt. % | No. of days of bleed resistance retention (day) |
|---|---|---|---|---|---|
| Example 7 | C1 20 | 10 | 0 | 70 | 21 |
| Comp. ex. 5 | C2 20 | 10 | 0 | 70 | 21 |
| Comp. ex. 6 | C3 20 | 10 | 0 | 70 | 3 |
| Comp. ex. 7 | C4 20 | 10 | 0 | 70 | 3 |
| Comp. ex. 8 | 0 | 0 | 30 | 70 | 21 |

Component
(C): ammonium polyphosphate
C1: compound prepared in Example 1
C2: Exolit® 422 (made by Höchst Co., Ltd.)
C3: compound prepared in Comparative example 1
C4: compound prepared in Comparative example 3
Component (D): polymer of 2-piperadinylene-4-morpholino-1,3,5-triazine
Component (E): a mixture of Exolit® 422 with polymer of 2-piperadinylene-4-morpholino-1,3,5-triazine (made by Monteflous Co., Ltd.)
Component (G): ethylene-propylene block copolymer as polypropylene resin (ethylene content: 8.5 wt. %, melt flow rate: 20 g/10 min.)

TABLE 3

| | Component (A) wt. % | Component (B) wt. % | Component (C) wt. % | Component (D) wt. % | Component (E) wt. % | Component (F) wt. % | Component (G) wt. % | Combustion property 0.8 mm | Izod impact strength Kg · cm/cm | Dupont impact strength (10° C.) |
|---|---|---|---|---|---|---|---|---|---|---|
| Example 8 | 10 | 10 | C1 21 | 8 | 0 | 1 | 50 | V-0 | 5.5 | 81.0 |
| Example 9 | 10 | 10 | C2 21 | 8 | 0 | 1 | 50 | V-0 | 5.6 | 79.5 |
| Comp. ex. 9 | 10 | 10 | C3 21 | 8 | 0 | 1 | 50 | V-0 | 4.4 | 33.5 |
| Comp. ex. 10 | 10 | 10 | 0 | 0 | 29 | 1 | 50 | V-0 | 3.7 | 19.0 |

Component (A): polyethylene resin, M680 made by Chisso Corporation (melt index: 6.5 g/10 min.)
Component (B): ethylene-propylene rubber, EP 02P made by Japan Synthetic Rubber Co., Ltd.
Component
(C): ammonium polyphosphate
C1: APP prepared in Example 2
C2: APP prepared in Example 4
C3: Exolit® 422 made by Höchst Co., Ltd.
Component (D): polymer of 2-piperadinylene-4-morpholino-1,3,5-triazine
Component (E): a mixture of Exolit® 422 with polymer of 2-piperadinylene-4-morpholino-1,3,5-triazine (MF82/PP made by Monteflous Co., Ltd.)
Component (F): vinyltrimethoxysilane
Component (G): ethylene-propylene block copolymer as polypropylene resin (ethylene content: 8.5 wt. %, melt flow rate: 20 g/10 min.)

Example 10

A mixture of $(NH_4)_2HPO_4$ (660 g, 5 mols) with $P_2O_5$ (710 g, 5 mols) was placed in a total capacity 5 l table kneader preheated to 290°–300° C., while keeping a nitrogen gas atmosphere, followed by heating and agitating. After 5 minutes, the total quantity melted to form a melt of 286° C.

This melt was kept at the same temperature and agitated. After lapse of 20 minutes, 76.9% (80° C.) of urea solution (97.5 g which corresponds to 50% of byproduced ammonia required stoichiometrically) was added by spray over 7 minutes, followed by successively agitating and aging the mixture at 250° to 270° C. for 2 hours, while feeding ammonia gas at a rate of 2 l/min., to obtain powdery APP (1,450 g) containing a small quantity of aggregates. In order to separate these aggregates into single crystals, the powder was roughly ground by means of a grinder (AP-B type made by Hosokawa Micron Co., Ltd.). The physical characteristics of the resulting product are shown in Table 5.

Examples 11–15 and Comparative examples 11–15

Example 10 was repeated except that the retention time of melt of 286° C., and the quantity of 76.9% urea solution added and the time required for the addition thereof shown in Table 4 were employed. The physical characteristics of the resulting products are shown in Table 5.

TABLE 4

| | Retention time of melt at 286° C. | 76.9% Urea solution Added quantity (note 1) | Time required for addition |
|---|---|---|---|
| Example 11 | 20 min. | 176 gr (90%) | 7 min. |
| Example 12 | 20 min. | 145 gr (75%) | 7 min. |
| Example 13 | 20 min. | 58.5 gr (30%) | 7 min. |
| Example 14 | 10 min. | 97.5 gr (50%) | 7 min. |
| Example 15 | 240 min. | 97.5 gr (50%) | 7 min. |
| Comp. ex. 11 | 0~5 min. | 176 gr (90%) | 7 min. |
| Comp. ex. 12 | 20 min. | 195 gr (100%) | 7 min. |
| Comp. ex. 13 | 20 min. | 48.8 gr (25%) | 7 min. |
| Comp. ex. 14 | 20 min. | 97.5 gr (50%) | 30 min. |
| Comp. ex. 15 | 20 min. | 97.5 gr (50%) | 60 min. |

Note 1: Quantity of byproduced ammonia required stichiometrically and its percentage.

TABLE 5

| | Physical properties | | | | |
|---|---|---|---|---|---|
| | Crystal- | Particle diameter | | Specific | |
| Example | line | Average | 10 μm or less (%) | surface area | Smoothness |
| Example 10 | II type | 6.8 | 80 | 0.75 | Smooth |
| Example 11 | II | 6.4 | 83 | 0.82 | Smooth |
| Example 12 | II | 6.8 | 82 | 0.78 | Smooth |
| Example 13 | II | 8.0 | 75 | 0.70 | Smooth |
| Example 14 | II | 6.8 | 81 | 0.75 | Smooth |
| Example 15 | II | 6.8 | 79 | 0.73 | Smooth |
| Comp. ex. 11 | II + I | 6.5 | 80 | 1.08 | Strained |
| Comp. ex. 12 | II | 6.5 | 84 | 1.10 | Strained |

TABLE 5-continued

| Example No. | Crystalline form | Particle diameter Average diameter | Particle diameter 10 μm or less (%) | Specific surface area | Smoothness |
|---|---|---|---|---|---|
| Comp. ex. 13 | II | 10.5 | 45 | 0.65 | Smooth |
| Comp. ex. 14 | II | 11 | 40 | 0.60 | Smooth |
| Comp. ex. 15 | II | 12 | 35 | 0.50 | Smooth |

Example 16 and Comparative example 16

As the polypropylene resin, a crystalline ethylene-propylene block copolymer (ethylene content: 8.5 wt. %, melt flow rate (quantity of molten resin extruded at 220° C., under a load of 2.16 Kg and over 10 minutes) of 20 g/10 min. (70 wt. %), various APPs obtained in Examples 10–15 and Comparative examples 11–15 (20 wt. %), as the compound (N), 2-piperadynylene-4-morpholine-1,3,5-triazine polymer (10 wt. %), and further as resin stabilizers,

| | |
|---|---|
| 2,6-di-t-butyl-p-cresol | 0.15 wt. %, |
| di-milistyl-β,β'-thiodipropionate | 0.20 wt. % and |
| calcium stearate | 0.10 wt. %, | were placed in Cooking Mixer (tradename), followed by mixing them with stirring for one minutes, melt-kneading the resulting mixture by means of Minimax (tradename), extruding the resulting material at 210° C. into pellets, molding the respective pellets by means of a heat press molding machine having the press temperature set to 210° C., into definite test pieces for bleed test, and subjecting the test pieces to bleed test measurement. The results are shown in Table 6.

TABLE 6

| Kind of APP used | Number of days of bleed resistance retention |
|---|---|
| Substance prepared in Example 10 | 21 days |
| That in Example 11 | 21 days |
| That in Example 12 | 21 days |
| That in Example 13 | 21 days |
| That in Example 14 | 21 days |
| That in Example 15 | 21 days |
| That in Comp. ex. 11 | 3 days |
| That in Comp. ex. 12 | 3 days |
| That in Comp. ex. 13 | 21 days |
| That in Comp. ex. 14 | 21 days |
| That in Comp. ex. 15 | 21 days |

What we claim is:

1. A process for producing ammonium polyphosphate which comprises the steps of
   (a) bringing together ammonium phosphate and phosphorous anhydride in substantially equimolar quantities in a nitrogen gas atmosphere free of added ammonia at a temperature of at least 250° C. to thereby produce a molten reaction liquid,
   (b) feeding into said molten reaction liquid a quantity of ammonia gas or an ammonia generating compound sufficient to
      (1) effect instantaneous crystallization, and
      (2) form a granular powder, and
   (c) subjecting said granular powder to heat treatment in an ammonia gas atmosphere to thereby obtain finely divided particles of ammonium polyphosphate having II type structure at least 80% of the particles having a diameter of 10 μm or less.

2. A process according to claim 1 wherein in step (a) the temperature is maintained at 250°–320° C. for at least 10 minutes.

3. A process according to claim 1 wherein in step (b) the time period of feeding is between 5 and 30 minutes.

4. The process according to claim 1 wherein in step (c) the contact with ammonia gas is at a temperature of at least 240° C. for at least 30 minutes.

* * * * *